United States Patent [19]
McGarry

[11] Patent Number: 5,415,894
[45] Date of Patent: May 16, 1995

[54] ENHANCED SURFACE APPEARANCE OF GLASS FIBER REINFORCED PLASTICS

[75] Inventor: Frederick J. McGarry, Weston, Mass.

[73] Assignee: GenCorp Inc., Fairlawn, Ohio

[21] Appl. No.: 252,480

[22] Filed: Jun. 1, 1994

Related U.S. Application Data

[63] Continuation of Ser. No. 904,811, Jun. 26, 1992, Pat. No. 5,358,779.

[51] Int. Cl.$^6$ .................. B32B 27/08; B32B 27/36; B32B 27/38
[52] U.S. Cl. .................. 427/386; 427/393.5; 428/480; 264/255; 264/257; 156/315; 525/531
[58] Field of Search .................. 428/423.7, 480; 264/255, 257; 427/386, 393.5; 156/315; 525/531

[56] References Cited

U.S. PATENT DOCUMENTS

| | | | |
|---|---|---|---|
| 2,668,789 | 2/1954 | Phreaner . | |
| 3,562,094 | 2/1971 | Chmiel . | |
| 3,620,900 | 11/1971 | Williger | 428/327 |
| 3,857,730 | 12/1974 | Kalafus et al. | 156/331.5 |
| 3,949,125 | 4/1976 | Roberts | 428/99 |
| 4,018,250 | 4/1977 | Waters | 138/140 |
| 4,029,845 | 6/1977 | Nomura | 428/415 |
| 4,129,670 | 12/1978 | Riew | 427/386 |
| 4,130,686 | 12/1978 | Takahashi et al. | 428/294 |
| 4,233,352 | 11/1980 | Ono et al. | 428/141 |
| 4,242,415 | 12/1980 | Feltzin et al. | 428/412 |
| 4,331,735 | 5/1982 | Shanoski | 428/423.7 |
| 4,350,739 | 9/1982 | Mohiuddin | 428/245.1 |
| 4,409,270 | 10/1983 | Faber et al. | 428/424.4 |
| 4,414,272 | 11/1983 | Watanabe et al. | 428/331 |
| 4,443,507 | 4/1984 | Yamada et al. | 428/114 |
| 4,508,785 | 4/1985 | Cobbledick et al. | 428/424.4 |
| 4,532,299 | 7/1985 | Seneker | 528/110 |
| 4,551,488 | 11/1985 | Leech et al. | 428/901 |
| 4,559,256 | 12/1985 | Matsumoto | 428/141 |
| 4,814,207 | 3/1989 | Siol et al. | 427/393.5 |
| 4,837,057 | 6/1989 | Bartoszek-Loza et al. | 427/388.4 |

*Primary Examiner*—Patrick J. Ryan
*Assistant Examiner*—Richard P. Weisberger
*Attorney, Agent, or Firm*—Robert F. Rywalski; Samuel B. Laferty

[57] ABSTRACT

A method for enhancing the surface appearance of thermoset FRP wherein a thin rubbery coating is applied to a sheet molded compound (SMC). This coating, when applied to FRP inhibits propagation of micro cracks to the surface of compliant rubbery coating of the parts, while not sacrificing the physical properties of the molded parts. The coating also supplies a suitable smooth surface for automotive body panel applications that serves as a substrate for further paint applications.

12 Claims, 2 Drawing Sheets

ENHANCED SURFACE APPEARANCE OF GLASS FIBER REINFORCED PLASTICS

CROSS-REFERENCE

This is a continuation of application Ser. No. 07/904,811, filed Jun. 26, 1992, of Frederick J. McGarry, for Enhanced Surface Appearance of Glass Fiber Reinforced Plastics (FRP)," now U.S. Pat. No. 5,358,779.

FIELD OF THE INVENTION

This invention relates to thin rubbery coating compositions applied to fiber reinforced plastic (FRP) to inhibit propagation of micro cracks to the surface of molded parts. The cracks which are inhibited are a cosmetic blemish on the surface of FRP and do not seriously degrade the mechanical or structural integrity of the part.

BACKGROUND

Various fiber reinforced plastic parts such as cured sheet molded compounds (SMC) can form cracks which appear at about 0.02–0.3 percent strain which affect surface appearance and can lead to rejection of a structurally and mechanically sound molded part. These cracks can nucleate other types of failures in subsequent coatings on the molded part.

SUMMARY OF THE INVENTION

A laminate having enhanced surface appearance comprising a fiber reinforced plastic (FRP) and a thin coating made from a liquid rubber and liquid epoxy polymer is disclosed. It is an object of the invention to reduce and mask surface cracking without sacrificing physical properties of the laminate. This coating which functions as a primerlike coating could replace in-mold coatings presently used to enhance surface appearance, reduce porosity, and reduce sink marks on molded products from thermosetting FRP from sheet molded compound (SMC), bulk molding compounds (BMC), and thick molding compounds (TMC). Specifically, this invention is useful in automotive body parts, furniture, sporting goods, chemical processing equipment, and the like.

DETAILED DESCRIPTION OF THE INVENTION

Figure 1:
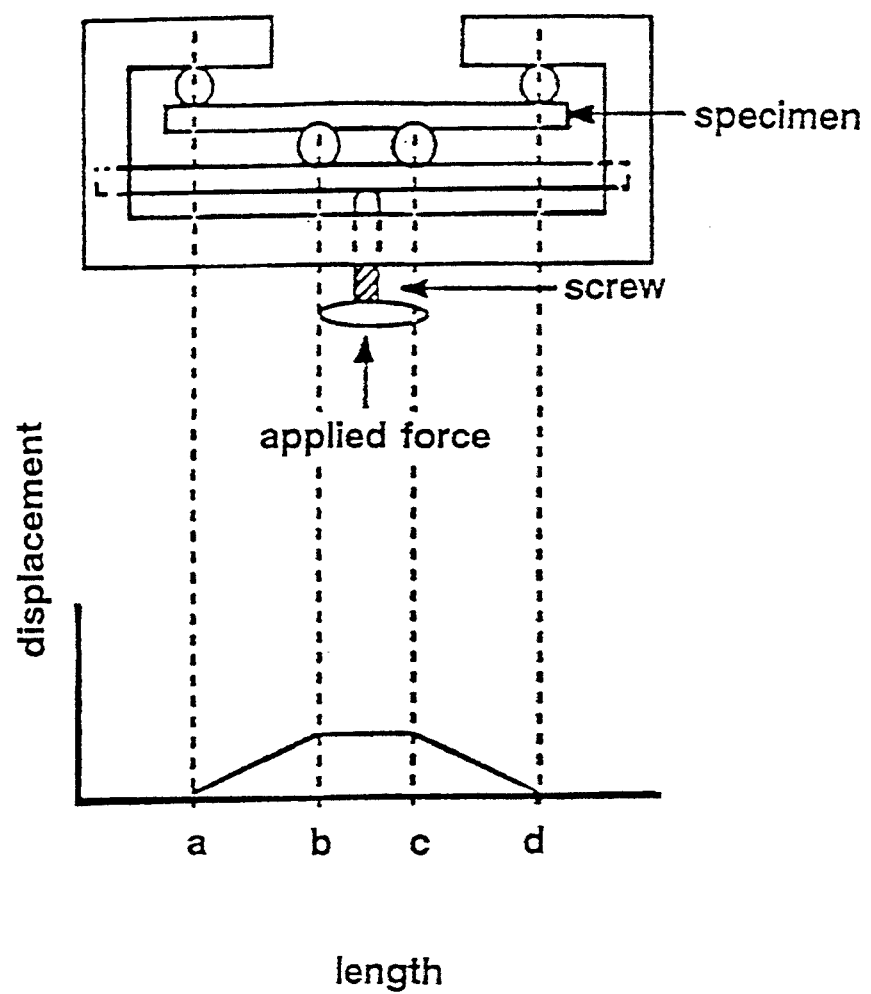
FIG. 1 shows the four point bending test where deformation is supplied by a micrometer screw.
Figure 2:
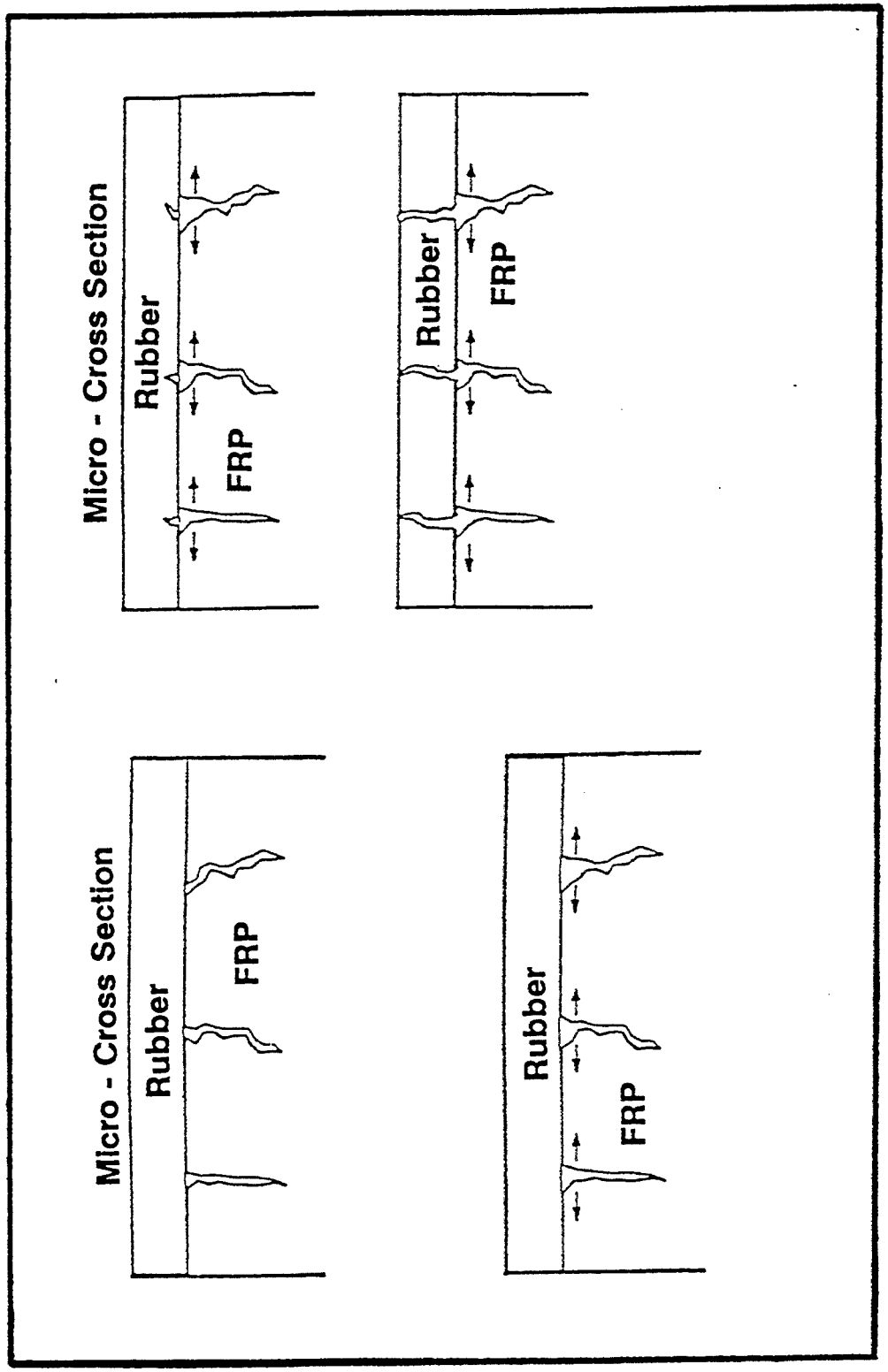
FIG. 2 shows a coated FRP material developing cracks during deformation.

Surface appearance of thermosetting FRP such as SMC, BMC and TMC is degraded by the presence of small cracks which can form at tensile strains from bending that are generally as low as 0.3 percent. The structural integrity of the material is not affected by the cracks, hence, this invention relates to a coating composition and procedure which masks them. The substrate for this material is generally a fiber reinforced plastic FRP made from a thermoset resin such as sheet molding compound (SMC). The substrate is generally made from a composition, which may be a polyester resin or vinyl ester resin that are crosslinkable with ethylenically unsaturated monomers such as styrene. Reinforcing fibers and assorted fillers are often added to increase strength and rigidity. Additional resins, processing aids, colorants and environmental protectorants can also be used.

The matrix material of the invention is generally an unsaturated polyester resin. One preferred resin is based on the reaction of 1,2 propylene glycol, and an ethylenically unsaturated diacid or anhydride. Other suitable unsaturated polyester resins which cab be utilized in the present invention are well known and include products of the condensation reaction of low molecular weight diols, (that is, diols containing from 2 to 12 carbon atoms and desirably from 2 to 6 carbon atoms) with dicarboxylic acids or their anhydrides containing from 3 to 12 carbon atoms and preferably from 4 to 8 carbon atoms provided that at least 50 mole percent of these acids or anhydrides contain ethylenical unsaturation. Examples of diols include 1,2-propylene glycol, ethylene glycol, 1,3-propylene glycol, diethylene glycol, di-1,2-propylene glycol, 1,4-butanediol, neopentyl glycol, and the like. A preferred diol is 1,2 propylene glycol. Mixtures of diols may also be advantageously used. Preferred acids include fumaric acid, maleic acid, whereas preferred anhydrides include maleic anhydride. Often, mixtures of acids and/or anhydrides are utilized with the preferred acids or anhydrides and such compounds include phthalic anhydride, isophthalic acid, terephthalic acid, adipic acid, glutaric acid, and the like, catalyzed by compounds such as organotitanates and organo tin compounds such as tetrabutyl titanate or dibutyl tin oxide, and the like.

Various other types of unsaturated polyesters can be utilized. Another type is described in R. J. Herold U.S. Pat. No. 3,538,043 which is hereby fully incorporated by reference. Typically, the polyesters are made by interpolymerization of maleic anhydride with oxiranes substituted with alkyls containing from 0 to 4 carbon atoms. Examples of oxiranes include ethylene oxide, propylene oxide, and butylene oxides. In addition to maleic anhydride, other anhydrides can be utilized in amounts up to 50 mole percent (i.e. from 0 to 50 mole percent) of the total anhydride charge, wherein said anhydride has from 4 to 10 carbon atoms, such as phthalic anhydride, nadic anhydride, methyl nadic anhydride, tetrahydrophthalic anhydride, succinic anhydride, and cyclohexane-1,2-dicarboxylic acid anhydride. The molar ratio of oxirane to anhydride can be from about 1.0 to about 2.0, and preferably from about 1.0 to about 1.3.

In the preparation of the unsaturated polyesters from oxiranes and anhydrides, small amounts from about 5 to about 30 parts by weight per 100 parts by weight of the polyester forming monomers of initiators are utilized. Examples of specific initiators include polyols, for example diols, triols, tetrols, having from 2 to 12 carbon atoms, or dicarboxylic acids containing from 3 to 10 carbon atoms, as for example fumaric acid, succinic acid, glutaric acid, and adipic acid. The molecular weight of the polyol is generally less than 500, preferably less than 200. Diols and dicarboxylic acid initiators result in linear, difunctional polyester chains with an average of two hydroxyl end groups per polymer chain. Triols produce polyester chains with an average of 3 arms and 3 hydroxyl end groups, and tetrols result in 4 arm chains with 4 hydroxyl end groups. Various catalysts can be utilized such as a zinc hexacyano cobaltate complex, and the like, as described in U.S. Pat. No. 3,538,043 which is hereby fully incorporated by reference.

Regardless of whether an unsaturated polyester made from an oxirane or a diol is utilized, the molecular weight thereof is from about 1,000 to about 10,000 and preferably from about 1,200 to about 5,000. The polyester portion of the solution of polyester resin in ethylenically unsaturated monomer can be present from about 50 to about 80 and preferably about 60 to about 70 weight percent based on the total polyester resin weight of the polyester and ethylenically unsaturated monomers. The polyester resin, consisting of the polyester and ethylenically unsaturated monomers, can be from about 10 percent to about 80 percent by weight, and preferably 10 to about 30 percent of the composite fiber reinforced plastic.

Another important component of a typical molding composition of the present invention are ethylenically unsaturated monomers or crosslinking agents such as a polymerizable vinyl or allyl compounds, such as a vinyl substituted aromatic having from 8 to 12 carbon atoms, as for example styrene, a preferred monomer, vinyl toluene, divinyl benzene, diallyl phthalate, and the like; acrylic acid esters and methacrylic acid esters wherein the ester portion is an alkyl having from 1 to 10 carbon atoms such as methyl acrylate, ethyl acrylate, N-butyl acrylate, 2-ethyl-hexyl acrylate, methyl methacrylate, ethylene glycol dimethacrylate trimethylolpropane trimethacrylate, and the like. Other unsaturated monomers include vinyl acetate, diallyl maleate, diallyl fumarate, vinyl propionate, triallylcyanurate, and the like. Mixtures of the above compounds can also be utilized. The total amount of the unsaturated monomers generally varies from about 20 percent to about 50 percent and desirably from about 30 percent to about 40 percent by weight based upon the total weight of the ethylenically unsaturated monomers and the polyester.

The fiber can generally, be any reinforcing fiber such as glass, aramid, nylon, polyester, graphite, boron, and the like. Fiber structure suitable for incorporation into the matrix include generally individual fibers, various types of woven fibers, or any general type of nonwoven fibers. Included within the woven class is any general type of woven fabrics, woven roving, and the like. Generally included within the nonwoven class is chopped strands, continuous filaments or rovings, reinforcing mats, nonreinforcing random mats, fiber bundles, yarns, non-woven fabrics, etc. Coated fiber bundles, comprising about 5 to about 50 or 150 strands, each having about 10 to about 50 fibers, highly bonded together with a conventional sizing agents such as various amino silanes, are preferred. The fiber structure may be randomly distributed within the matrix or be arranged in selected orientations such as in parallel or cross plies or arranged in mats or woven fabrics, etc. The fibers may comprise from about 5 percent up to about 85 percent by weight of the composite and preferably from 20 percent to 50 percent by weight of the composite. The specific quantity of fiber structure in the composite can be varied consistent with the physical properties desired in the final composite molded article.

Various other components or additives can optionally be utilized to form the molding compound composition. For example, various thermoplastic polymers (low profile or low shrinkage compounds) can be utilized. Typical low profile compounds include polyvinyl acetate, saturated polyesters, polyacrylates or methacrylates, saturated polyester urethanes, and the like. The amount of such polymers is from about 10 parts by weight to about 50 parts by weight, with from about 20 parts by weight to about 40 parts by weight being preferred based upon the weight of unsaturated polyester and the amount of ethylenically unsaturated monomer in the mixture. Other additives which can also be utilized include internal mold release agents such as zinc stearate; mineral fillers such as calcium carbonate, Dolomite, clays, talcs, zinc borate, perlite, vermiculite, hollow glass, solid glass microspheres, hydrated alumina, and the like. Generally, mineral fillers can be used in weight percentages of the total composition up to 80 and desirably from about 20 to about 70, such that a final composition could be made up primarily of filler.

In addition to polyesters, other suitable matrix materials include vinyl ester resins. The general structure of a typical vinyl ester resin is

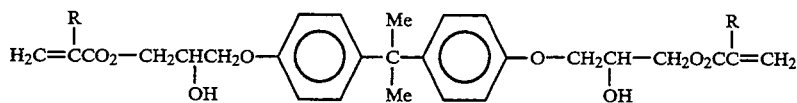

where R is a hydrogen atom or an alkyl group. Vinyl ester resins are prepared by reacting epoxy resins such as the addition products of 1-chloro-2,3-epoxypropane with 2,2'-bis(4-hydroxyphenyl)propane with either methacrylic or acrylic acid. The terminal unsaturation can be crosslinked with styrene in -the same fashion as an unsaturated polyester. These compounds can be substituted on an equivalent weight basis for the unsaturated polyester resins of this invention for up to 100 percent of the unsaturated polyester resin component.

Conventional catalysts can be used to cure the matrix. Examples of such catalysts for the cure of unsaturated polyester or vinyl ester resins include organic peroxides and hydroperoxides such as benzoyl peroxide, dicumyl peroxide, cumene hydroperoxide, paramethane hydroperoxide, and the like, used alone or with redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like. The amounts of these catalysts generally varies from about 0.1 to about 5; and desirably from about 0.2 to about 2 parts by weight based upon 100 parts by weight of unsaturated polyester, vinyl ester resins, and ethylenically unsaturated monomers.

The commercial manufacture of FRP depends on the particular molding operations to be performed and the structure of the molded part. The general requirements are that the resin components be intimately mixed and any fillers or fibers are well distributed in the resin and their surfaces wetted or contacted with the resin to assure strong interfacial bonding between the components. These mixing and molding operations are well known. In the SMC examples used in this embodiment, the polyester resin with its additives and catalysts is well mixed. Chopped fiberglass fibers randomly oriented are mixed into the resin. The composite material is further mixed to assure good fiber wetting and is sandwiched into a sheet between two carrier films. This sheet is collected and allowed to mature. The carrier films are removed before molding. The SMC sheet is molded in compression molds at pressures up to 2000 psi and temperatures up to 350° F. (177° C.). The molding temperature depends on the part thickness, the in-mold time, and the catalyst chosen for polymerizing the ethylenically unsaturated monomer and crosslinking the polyester resin.

The coating for the substrate of the current invention is generally the reaction product of a liquid epoxy and an amine-terminated rubbery polymer. The amine-terminated liquid rubber has one or more end groups that are amine groups known to be reactive with epoxy groups. Desirably 50 percent of the amine-terminated polymers have both ends converted to amines and preferably 85 percent are so converted. Examples of rubbery material include amine-terminated butadiene-acrylonitrile (ATBN) which is a copolymer of butadiene and acrylonitrile. These copolymers are prepared in accordance with conventional techniques well known to the art and to the literature and are generally made from one or more monomers of acrylonitrile or an alkyl derivative thereof with one or more conjugated dienes and optionally one or more monomers of acrylic acid, or an ester thereof. Examples of acrylonitrile monomers or alkyl derivatives thereof include acrylonitrile and alkyl derivatives thereof having from 1 to 4 carbon atoms such as methacrylonitrile, and the like. The amount of the acrylonitrile or alkyl derivative monomer is from about 5 percent to about 40 percent by weight and preferably from about 7 percent to about 30 percent by weight based upon the total weight of the nitrile containing copolymer.

The conjugated diene monomers generally have from 4 to 10 carbon atoms with from 4 to 6 carbon atoms being preferred. Examples of specific conjugated diene monomers include butadiene isoprene, hexadiene, and the like. The amount of such conjugated dienes is generally from about 60 percent to about 95 percent by weight and preferably from about 70 percent to about 93 percent by weight based upon the total weight of the nitrile rubber forming monomers. Such mono or difunctional nitrile rubbers can be readily prepared generally containing either hydroxyl or carboxyl or amine functional groups as end groups and are commercially available such as from The BFGoodrich Company under the trade name Hycar ®.

The amine-terminated flexible polymer segments are generally liquid polymers that enhance the toughness and pliability of polymers or copolymers. Flexible polymers having other functional end groups such as OH, COOH, or epoxy can be converted to amine functional end groups through known chemical reactions such as reacting a carboxyl terminated flexible polymer with diamines to change the terminal ends of the polymer to amine groups.

The molecular weight of these amine-terminated liquid rubbery polymers ranges generally from about 1000 to about 6000, desirably from about 2000 to about 4000, and is preferably around 3,500. The amount of amine-terminated liquid rubbery polymer is from about 200 to about 900 parts by weight, desirably from about 300 to about 600 parts by weight, and preferably about 475 parts by weight (pbw) based upon 100 parts by weight of an epoxy resin. Another criteria for the ratios of liquid polymer to epoxy resin is the equivalent ratios of functional epoxy groups to amine reactive groups. This ratio can vary from about 4:1 to about 1:2, and is preferably about 2:1 to about 1:1.2.

The coating for the substrate may also contain fillers, such as silica, talc, or conductive carbon black; antioxidants, antiozonants, processing aids, plasticizers, and coloring pigments.

The coating can contain curative components for the epoxy amine reaction. These can consist of various amine-containing compounds that can function as co-reactants or catalysts and Lewis acids. The curative component can be present from about 0.1 to about 15 parts, desirably from about 0.2 to about 10 parts, and preferably 0.5 to about 3 parts by weight per 100 parts by weight of the epoxy resin and amine-terminated rubbery polymer. These can be tertiary amines and Lewis acid catalysts that generally function as catalysts only. Other curative components that can function as co-reactants are aliphatic amines, amido amines, and phenol/urea/melamine formaldehyde compounds. These curative components that react as co-reactants are generally present at 20 weight percent or less and desirably 10 weight percent or less based on the weight of the amine-terminated rubbery polymers.

The preferred curative components are tertiary amines and salts of tertiary amines such as Ancamine ® K61B 2-ethyl hexanoic acid salt of 2,4,6 tris (N, N dimethylaminomethyl) phenol; tris(dimethylaminomethyl) phenol; N-benzyldimethylamine; dimethylaminomethyl phenol; diazabicycloundecene; triethylene diamine; and phenol, 2 ethylhexcanoic acid, formic acid, and p-toluenesulfonic acid salts of diazabicycloundecene. The curing temperature for the epoxy-amine reaction is controlled by the choice of curative components and their amounts. The curing temperature can vary from 25° C. to about 200° C.

The reaction of the amine-terminated rubbery polymer with the epoxy forms a rubbery coating on the FRP. The rubbery coatings are typically about 1 to about 200 μm thick, desirably about 1 to about 100 μ thick, and preferably from about 2 to about 40 μm thick.

The epoxy resin component of the invention is comprised of one or more of the curable resins containing more than one 1,2-epoxy group per molecule. Epoxy compounds can be any monomeric or polymeric compound or mixtures of compounds having an epoxy equivalency greater than one, that is, wherein the average number of epoxy groups per molecule is greater than one, with monomeric epoxides having two epoxy groups being currently preferred. Epoxy compounds are well known. See, for example, U.S. Pat. Nos. 2,467,171; 2,615,007; 2,716,123; 3,030,336; and 3,053,855. Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; cycloaliphatic epoxy resins made from epoxidation of cycloolefins with peracids; the polyglycidyl esters of aliphatic, cycloaliphatic, or aromatic polycarboxylic acids, such as oxalic acid, succinic acid, glutaric acid, terephthalic acid, 2,6-naphthalene dicarboxylic acid, hexahydrophthalic acid, and dimerized linoleic acid; the polyglycidyl ethers of polyphenols, such as bisphenol A, 1,1-bis(4-hydroxyphenyl) isobutane, and 1,5-dihydroxynaphthalene; and novolak resins, such as epoxy phenol novolak resins, epoxy cresol novolak resins, aromatic glycidal amine resins such as triglycidal derivative of p-aminophenol.

One effective epoxy resin is a DGEBA such as Epon 828 made from bisphenol A and epichlorohydrin having 2 functional epoxy groups and a molecular weight of from 360 to 384. Preferred epoxy resins have low molecular weights such as from 200 to about 1000. Solvents are used to lower the viscosity of the coating so it can be sprayed. Generally, any solvent that is compatible with the system can be used. A specific example is toluene. The amount of toluene is an effective amount to produce 1 to 60 percent solids content in solution. Preferably for spray coating solids are from about 2 to about 10 percent solids content.

Any method resulting in a consistent coating may be used such as spraying, brushing, rolling and dip coating. The finish should be suitable for automotive exterior body panel applications. With the amine terminated butadiene-acrylonitrile and Epon 828 system, the material is then cured at about 176° F. (80° C.) for about 30 minutes. A second curing step is done with a temperature of about 248° F. (120° C.) for two hours in an air oven. The cure cycle for other systems would depend on the reactivity of the functional groups at a specific temperature and the presence of any curative component for the epoxy-amine reaction. The temperature range for curing includes 25°–200° C.

FOUR POINT BENDING TEST METHOD

Samples of molded SMC 7113 (fiberglass reinforced sheet molded compound available from GenCorp) having physical dimensions of 0.10 inches thick, approximately 0.5 inches wide and 3.0 inches long (0.25×1.3×7.6 cm) were mounted in the four point bending device shown in FIG. 1. The composition of SMC 7113 is given in Table 1 and the material can be cured at 1000 psi (6.9 MPa or more pressure) at 150° C. for at least 2 minutes. The specimen had been cut with a diamond saw and polished with 60 grit and subsequently 400 grit paper. An applied force was produced by turning the micrometer and deforming the sample as shown in FIG. I.

The strain was calculated as $$\frac{3tD}{2L_1(L_1 + L_2)}$$

where
t is the sample thickness,
D is the displacement at the loading points,
$L_1$ is the distance from the load point to the nearer support point, i.e., =b—a or d—c (a, b, c & d shown in FIG. 1).
and $L_2$ is the distance from the load point to the center of the beam, i.e., =0.1/2 (c—b).

The micrometer screw was slowly turned a short distance (example ¼ turn on a 40 thread per inch thumbscrew at a rate of 0.38 inch/minute). After each incremental turn, the specimen was wiped with India ink and examined for hairline cracks. Any cracks were recorded along with the strain level at which they were discovered. Cracked samples were discarded and uncracked samples were further strained.

COMPARATIVE EXAMPLE

Two groups of SMC 7113 sheets were tested. The first sixty specimens had an average strain to first crack of 0.20 percent with a standard deviation of 0.07. The second 120 specimens had an average strain to first crack of 0.35 with a standard deviation of 0.08.

TABLE 1

| PASTE COMPOSITION Typical composition of 7113 SMC. | |
|---|---|
| Paste | |
| Unsaturated Polyester | 13.8%, by weight |
| Low Profile Additive | 9.2% |
| Styrene | 3.7% |
| Inhibitor | 0.005% |
| Peroxide Catalyst | 0.25% |
| Viscosity Reducer | 0.8% |
| Mold Release | 1.0% |
| Calcium Carbonate | 69.8% |
| MgO | 1.4% |
| TOTAL: | 100. |

Fiber Glass: 1 inch long chopped strand fiberglass
Final SMC Composition: 25 parts fiberglass based on 75 parts paste.

EXAMPLE A

Amine-terminated poly(butadiene-acrylonitrile) Hycar 1300×16 ATBN (475 parts by weight) from BFGoodrich was dissolved along with Epon 828 (100 parts by weight), in toluene to produce a 2 to 10 percent solids content in solution. This solution of ATBN and Epon 828 was airbrushed onto a 0.10 inches thick×0.5 inches wide×3.0 inches long (0.25×1.3×7.62 cm) SMC 7113 specimen. The thickness of the coating was adjusted by changing the concentration of rubber in the toluene solution. Coatings of between 10–100 μm were achieved. These were dried and then cured at 80° C. for 30 minutes and 120° C. for 2 hours. They were then mounted in the four point bending device using a micrometer to record strain. The specimens were strained to predetermined levels, metalized with gold and examined for cracks in SEM. The rubber coatings of 12 μm thickness were effective at masking cracks at strain levels up to 1.6 percent or more.

EXAMPLE B

The above-coated samples in Example A were also exposed to −40° F. (−40° C.) temperature for 30 minutes and then tested in the four point bending apparatus. In these tests, the 12 μm thick rubbery coating was also effective at masking cracks up to 1.6 percent strain or more.

EXAMPLE C

The coated samples in Example A were exposed to 300° F. (149° C.) temperatures similar to what automobile body panels would be exposed to during curing of paint finishes. They were then tested on the four point bending device. In these tests the 12μm thick rubbery coating was effective at masking cracks up to 1.6 percent strain or more.

EXAMPLE D

SMC specimens similar to those in Example A were coated with the same amine-terminated poly(-butadieneacrylonitrile) at a coating thickness of about 150 μm. These samples were conditioned at either −40° F. (−40° C.) or 300° F. (−149° C.) for 30 minutes before testing. They were tested for adhesion using a 90° peel test and an Instron 1122 with a controlled displacement rate. These results are shown in Table 2.

TABLE 2

ADHESION TEST RESULTS

TABLE 2-continued

Coated SMC Samples Conditioned at Low and High Temperatures

| Excursion Temperature | | Peel Force per Inch of Width | |
|---|---|---|---|
| °F. | °C. | g/in | Kg/m |
| −40 | −40 | 2900 | 114.2 |
| 70 | 21 | 1900 | 74.8 |
| 300 | 149 | 2400 | 94.5 |

The adhesion was not impaired by the exposure to severe temperatures. The increase in peel force in the cold specimen was attributed to the additional force necessary to bend the rubbery coating near its Tg temperature. The higher peel force after 300° F. (149° C.) exposure was attributed to additional curing of the rubbery coating or additional rubber/SMC contact during heating.

EXAMPLE E

Several commercially available coatings for flexible plastics were used as comparisons to the ATBN epoxy coating of this invention. The coatings were U04KD004 Weatherable Black Conductive Primer (bumper paint) from BASF, Flexible Clearcoat for Rigid or Flexible Substrates from BASF Code No. E86CA112 (Acrylic Enamel aka GM 998-4852, Chrysler MS-PA41-1), Universal White Basecoat for Automotive Applications from BASF Code No. E98WD403, and Tempo No. 20-19L Black Bumper Paint Elongations of the conductive primer was estimated to be about 15 percent. Elongations of the bumper paint was estimated to be >15 percent. Elongation of the white basecoat and clearcoat were estimated as at least 5 percent. The ATBN epoxy system had an elongation of at least 100 percent.

These coatings were applied with a draw bar on a standard SMC 7113 sheet disclosed in Example A. Runs 1 through 6 had a 2 mil (44μm) thick coating while runs 7-10 inadvertently received a 4 mil (88μm) thick coating. The results of percent elongation at first visible crack and multiple crack experiments are shown in Table 3. Runs 2 through 4 show a slight increase in percent elongation at first crack with any coating. Runs 5 through 10 show that the use of coatings with higher elongation give greater percent elongation at crack with the Epon 828 epoxy and ATBN coating giving the highest value. These coatings were dried and cured similarly to the coatings in Example A. They were then strained to predetermined extents and examined for microcracks by an equivalent procedure to that set out in Example A except that the strain to the appearance of first crack and to appearance of multiple cracks was recorded.

TABLE 3

| Trial | Run | System | % Elongation at First Crack | % Elongation at Multiple Crack |
|---|---|---|---|---|
| 1 | 1 | SMC 7113 control (no paint) | .58 | 1.05 |
| | 2 | SMC + primer | .71 | — |
| | 3 | SMC + top coat | .68 | — |
| | 4 | SMC + clear coat | .70 | — |
| | 5 | SMC + primer + top coat + clear coat | .77 | — |
| | 6 | SMC + bumper paint + top coat + clear coat | .98 | 1.21 |
| 2 | 7 | SMC + top coat + clear coat | .73 | 1.45 |
| | 8 | SMC + primer + top coat + clear coat | 1.14 | 1.97 → >2 |
| | 9 | SMC + bumper paint + top coat + clear coat (.74)* | 1.27 | >2 |
| | 10 | SMC + DGEBA epoxy − ATBN coat + top coat + clear coat (.95)* | 1.9 → >2 | (1.29) >2 |

*Values in parenthesis are elongations where the crack first appeared at the top coat − clear coat interface.
Paints used: Primer; BASF U04KD004A Black Conductive Primer Top Coat; BASF E98WD403 White Enamel Clear Coat; BASF E86CA112 Flexible Clear Coat Acrylic Enamel Bumper Paint; Tempo No. 20-19L Bumper Black DGEBA epoxy-ATBN; ATBN 1300 × 16/Epon 828/Toluene, weight ratios 33/7/60

This invention has utility in auto body parts, furniture, sporting goods, chemical processing equipment, and the like.

The composite material of the invention provides a molded part having better surface crack resistance. Parts can be molded to form automotive body panels, automotive structural components such as load bearing support members, aircraft components, housings for various electrical and household goods, sporting goods such as golf club shafts, rackets, etc. The substrate is preferably an FRP prepared from a sheet molding compound (SMC). However, FRP substrates in accordance with the invention can be made from wet lay-up, resin transfer molding, bulk molding, and the like. The finished substrate is then coated to inhibit crack propagation to the surface.

While in accordance with the Patent Statutes, the best mode and preferred embodiment has been set forth, the scope of the invention is not limited thereto, but rather by the scope of the attached claims.

What is claimed is:

1. A process for inhibiting surface cracking on coated thermoset plastic parts reinforced with 5 to 85 weight percent fibers, said process comprising:
   coating said plastic parts with a composition comprising:
   a reaction product of at least
   (a) a liquid epoxy resin comprising one or more resins having more than one 1, 2-epoxy group per molecule and
   (b) about 200 to 900 parts by weight of one or more liquid amine-terminated butadiene-acrylonitrile polymers per 100 parts by weight of said liquid epoxy resin, and
   curing said composition, wherein said composition forms a coating from 1 to 200 microns thick after curing and has an elongation capacity of at least 100%.

2. A process according to claim 1, wherein said fiber reinforced plastic parts further comprise cured unsaturated polyester resins.

3. A process according to claim 2, wherein said liquid epoxy resins include the reaction products of bisphenol A with epichlorohydrin having molecular weights from 200 to 1000, wherein said one or more amine-terminated butadiene-acrylonitrile polymers have molecular weights from 1000 to 4,000, and wherein about 300 to 600 parts by weight of said one or more amine-terminated butadiene-acrylonitrile polymer is used per 100 parts by weight of said liquid epoxy resin.

4. A process according to claim 3, wherein said 5 to 85 weight percent fibers are fiberglass fibers.

5. A process according to claim 3, wherein said fiber reinforced plastic parts are body panels for a vehicle.

6. A process according to claim 3, wherein at least 50 percent of said one or more liquid amine-terminated butadiene-acrylonitrile polymers have both terminal ends converted to amines.

7. A process according to claim 6, wherein said composition includes one or more curative components that are amine-containing compounds.

8. A process according to claim 2, wherein said fiber reinforced plastic parts have one or more coatings applied over said reaction product coating.

9. In a process for applying and curing a crack inhibiting coating of a thickness from 1 to 200 microns to a fiber reinforced plastic part the improvement wherein the coating comprises:

(a) a liquid epoxy resin comprising one or more resins having more than one 1,2-epoxy group per molecule and (b) about 200 to 900 parts by weight of one or more liquid amine-terminated butadiene-acrylonitrile polymers per 100 parts by weight of said liquid epoxy resin, and curing said coating, wherein said coating is from 1 to 200 microns thick after curing and has an elongation capacity of at least 100%.

10. In a process according to claim 9, wherein the fiber reinforced plastic part includes cured unsaturated polyester resins.

11. In a process according to claim 10, wherein the fibers include fiber glass fibers.

12. In a process according to claim 11, wherein the liquid epoxy resins includes epoxy resin from reaction of bisphenol A with epichlorohydrin having molecular weights from 200 to 1,000, wherein said one or more liquid amine-terminated butadiene-acrylonitrile polymers have molecular weights from 1,000 to 4,000 and are present from 300 to 600 parts by weight per 100 parts by weight of said liquid epoxy resin.

* * * * *